US012720633B2

(12) United States Patent
Chang et al.

(10) Patent No.: US 12,720,633 B2
(45) Date of Patent: Aug. 25, 2026

(54) HANDOVER INFORMATION REPORTING METHOD, USER EQUIPMENT, AND COMMUNICATION SYSTEM

(71) Applicant: SHARP KABUSHIKI KAISHA, Sakai City (JP)

(72) Inventors: Ningjuan Chang, Shanghai (CN); Renmao Liu, Shanghai (CN)

(73) Assignee: SHARP KABUSHIKI KAISHA, Sakai City (JP)

( * ) Notice: Subject to any disclaimer, the term of this patent is extended or adjusted under 35 U.S.C. 154(b) by 313 days.

(21) Appl. No.: 18/567,515

(22) PCT Filed: Jun. 8, 2022

(86) PCT No.: PCT/CN2022/097644
§ 371 (c)(1),
(2) Date: Dec. 6, 2023

(87) PCT Pub. No.: WO2022/257974
PCT Pub. Date: Dec. 15, 2022

(65) Prior Publication Data

US 2024/0215099 A1 Jun. 27, 2024

(30) Foreign Application Priority Data

Jun. 11, 2021 (CN) ........................ 202110658422.8

(51) Int. Cl.
*H04W 76/20* (2018.01)
*H04W 36/00* (2009.01)
*H04W 48/20* (2009.01)
*H04W 76/19* (2018.01)

(52) U.S. Cl.
CPC ....... *H04W 76/20* (2018.02); *H04W 36/0061* (2013.01); *H04W 36/0072* (2013.01); *H04W 48/20* (2013.01); *H04W 76/19* (2018.02)

(58) Field of Classification Search
None
See application file for complete search history.

(56) References Cited

U.S. PATENT DOCUMENTS

2022/0141725 A1* 5/2022 Parichehrehteroujeni .................. H04W 36/00837 370/331

OTHER PUBLICATIONS

CATT (Rapporteur), “Output of Email Discussion [107#45][NRSON] RACH and Mobility Robustness Optimisation Checking”, R2-1912147, 3GPP TSG-RAN WG2 Meeting #107bis Chongqing, P.R.China, Oct. 14-18, 2019.

(Continued)

*Primary Examiner* — Angela Nguyen
(74) *Attorney, Agent, or Firm* — ScienBiziP, P.C.

(57) ABSTRACT

The present disclosure provides a handover information reporting method, user equipment, and a communication system. The handover information reporting method of the present disclosure includes: determining, by user equipment (UE), whether a conditional handover (CHO) recovery condition is met; in the case that the CHO recovery condition is met, initiating, by the UE, a conditional handover to a selected cell, recovering a link by means of performing the conditional handover to the selected cell; and releasing, by the UE, a successful handover report (SHR)-related configuration.

7 Claims, 2 Drawing Sheets

(56) References Cited

OTHER PUBLICATIONS

Ericsson, "[Offline 801) [SON/MDT] Handover related SON aspects (Ericsson)", Tdoc R2-2106690, 3GPP TSG-RAN WG2 #114-e Electronic meeting, May 19-27, 2021.

* cited by examiner

Start

Step 1

UE determines that a CHO recovery condition is met, and the UE initiates a conditional handover to a selected cell, and recovers a link by means of performing the conditional handover to the cell Step 2

The UE releases an SHR-related configuration

HANDOVER INFORMATION REPORTING METHOD, USER EQUIPMENT, AND COMMUNICATION SYSTEM

TECHNICAL FIELD

The present disclosure relates to the technical field of wireless communications. More specifically, the present disclosure relates to a handover information reporting method in the case of a handover, corresponding user equipment, and a communication system.

BACKGROUND

A new research project on Release 17 technology standards (see non-patent literature: RP-193255: New WID on enhancement of data collection for SON/MDT in NR) was approved in the 3rd Generation Partnership Project (3GPP) RAN #86 plenary session held in December 2019. The research objective of this project is to enhance a network data collection procedure in an NR system so as to better achieve the objective of a self-organizing, self-optimizing network and minimization of drive tests. One of the specific techniques of the research is to achieve handover information reporting in a successful handover scenario.

The present disclosure provides a solution to the issue of how to implement handover information reporting in an NR system.

SUMMARY

An objective of embodiments of the present disclosure is to provide a solution to the issue of how to implement handover information reporting in an NR system in a successful handover scenario. More specifically, the present disclosure provides a solution to the issue of how to configure a handover information reporting configuration in an NR system and the issue of recording and reporting handover information after UE is configured with conditional handover (CHO) and a conditional handover recovery mechanism is enabled. Provided in the embodiments of the present disclosure are a handover information reporting method performed in user equipment, corresponding user equipment, and a communication system.

According to a first aspect of the present disclosure, a handover information reporting method is provided, comprising: determining, by user equipment (UE), whether a conditional handover (CHO) recovery condition is met; in the case that the CHO recovery condition is met, initiating, by the UE, a conditional handover to a selected cell, recovering a link by means of performing the conditional handover to the selected cell; and releasing, by the UE, a successful handover report (SHR)-related configuration.

In the above handover information reporting method according to the first aspect of the present disclosure, the SHR-related configuration may at least comprise a triggering condition for triggering the UE to record an SHR, the triggering condition comprising: a timer T310 threshold, a timer T312 threshold, and a timer T304 threshold.

In the above handover information reporting method according to the first aspect of the present disclosure, the selected cell may be a suitable cell selected by the UE in a cell selection procedure while a timer T311 is running, and the UE may release the SHR-related configuration at any time in a handover procedure of the selected cell performed by the UE.

In the above handover information reporting method according to the first aspect of the present disclosure, an operation of releasing the SHR-related configuration may be performed when the UE initiates the handover procedure or when the UE successfully completes the handover procedure.

According to a second aspect of the present disclosure, a handover information reporting method is provided, comprising: determining, by user equipment (UE), whether radio resource control (RRC) reconfiguration is performed due to conditional handover (CHO) recovery; in the case that the RRC reconfiguration is performed due to CHO recovery, skipping, by the UE, recording corresponding handover information in a successful handover report (SHR); and in the case that the RRC reconfiguration is not performed due to CHO recovery and an SHR triggering condition in an SHR-related configuration is met, recording, by the UE, the corresponding handover information in the SHR.

In the above handover information reporting method according to the second aspect of the present disclosure, when the RRC reconfiguration is successfully completed, the UE may determine whether to record the SHR.

According to a third aspect of the present disclosure, user equipment (UE) is provided, the user equipment comprising: a processor; and a memory storing instructions, wherein the instructions, when run by the processor, perform the handover information reporting method described herein.

According to a fourth aspect of the present disclosure, a communication system is provided, the communication system being provided with: a source cell communicating with user equipment (UE), and a target cell serving as an object to which the UE is handed over, the source cell transmitting a handover request message to the target cell, the handover request message comprising a successful handover report (SHR)-related configuration, the target cell transmitting to the source cell a handover request response message comprising a handover command, and the handover command comprising the SHR-related configuration received by the target cell.

In the above communication system according to the fourth aspect of the present disclosure, the source cell transmits the handover command to the UE.

BRIEF DESCRIPTION OF THE DRAWINGS

In order to understand the present disclosure and advantages thereof more fully, reference will now be made to the following description made in conjunction with the accompanying drawings.

In the drawings, identical or similar structures are marked by identical or similar reference numerals.

DETAILED DESCRIPTION

Figures 1, 2:
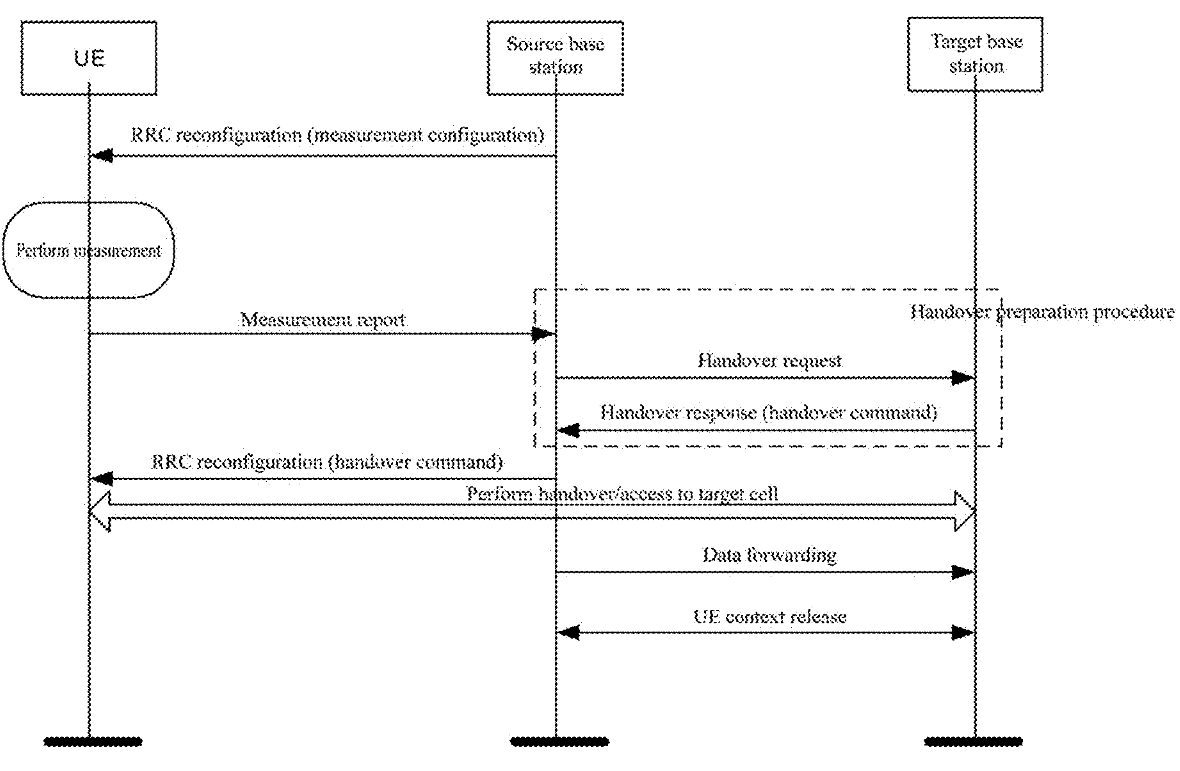
FIG. 1 is a schematic diagram showing a general handover procedure.
FIG. 2 is a flowchart showing an example of a handover information reporting method according to Example 1 of the present disclosure.

According to the following detailed description of exemplary embodiments of the present disclosure made in conjunction with the accompanying drawings, other aspects, advantages, and prominent features of the present disclosure will become apparent to those skilled in the art.

In the present disclosure, the terms "include" and "comprise" and derivatives thereof mean inclusion without limitation; the term "or" has an inclusive meaning and means "and/or".

In the present specification, the following various embodiments for describing the principles of the present disclosure are merely illustrative, and should not be interpreted in any way as limiting the scope of the disclosure. The following description with reference to the accompanying drawings is used to facilitate full understanding of the exemplary embodiments of the present disclosure defined by the claims and equivalents thereof. The following description includes a variety of specific details to facilitate understanding, but these details should be considered merely exemplary. Therefore, those of ordinary skill in the art should recognize that various changes and modifications may be made to the embodiments described herein without departing from the scope and spirit of the present disclosure. In addition, the description of the known function and structure is omitted for clarity and simplicity. In addition, the same reference numerals are used for similar functions and operations throughout the accompanying drawings.

A plurality of embodiments according to the present disclosure are specifically described below by using a Long Term Evolution (LTE)/NR mobile communication system and subsequent evolved versions thereof as an exemplary application environment. However, it is to be noted that the present disclosure is not limited to the following embodiments, but may be applied to other wireless communications systems. In the present disclosure, unless otherwise specified, the concept of a cell and the concept of a base station are interchangeable. An LTE system may also refer to a 5G LTE system and a post-5G LTE system (such as an LTE system referred to as an eLTE system or an LTE system that can be connected to a 5G core network). In addition, the LTE can be replaced with an evolved universal terrestrial radio access (E-UTRA) or an evolved universal terrestrial radio access network (E-UTRAN). In the present disclosure, a handover refers to change of a primary cell initiated by a network side, the change including inter-cell change of the primary cell and intra-cell change of the primary cell. That is, a primary cell of UE is changed from a source cell to a target cell, where the source cell and the target cell may be the same cell or different cells. In this procedure, a security key or keys or a security algorithm for access layer security may also be accordingly updated. The security includes encryption and decryption and integrity protection. The source cell may also be referred to as a source base station, or a source beam, a source transmission point (TRP), a source primary cell (PCell), or a source master cell group (MCG), and the target cell may also be referred to as a target base station, or a target beam, a target transmission point, a target primary cell (PCell), or a target master cell group (MCG). The source cell refers to a cell connected to and serving the UE before a handover procedure is initiated, namely, a cell transmitting to the UE a radio resource control (RRC) message including a handover command. The target cell refers to a cell connected to and serving the UE after the handover procedure is successfully completed, or a cell indicated by a target cell identifier included in the handover command, or a cell that performs downlink synchronization and random access in the handover procedure. The handover of the present disclosure may also refer to a change in the primary secondary cell (PSCell), and in this case, handover information or a handover report refers to handover information or a handover report related to the PSCell. The handover command described in the present disclosure is used to trigger the UE to execute a handover. In an NR system, the handover command is an RRC reconfiguration message including a synchronized reconfiguration (Reconfigurationwithsync) information element, or rather, the handover command is an RRC reconfiguration message including a synchronized reconfiguration (Reconfigurationwithsync) information element for a master cell group (MCG). In this case, the handover may also be referred to as an MCG synchronized reconfiguration. In an LTE system, the handover command is an RRC connection reconfiguration message including a mobility control information (MobilityControlInfo) information element. The synchronized reconfiguration information element or the mobility control information element may include configuration information of the target cell, for example, a target cell identifier, a target cell frequency, common configurations of the target cell such as system information, a random access configuration used by the UE to access the target cell, a security parameter configuration of the UE in the target cell, a radio bearer configuration of the UE in the target cell, and the like. For simplicity of description, in the present disclosure, the RRC reconfiguration message is equivalent to the RRC connection reconfiguration message; similarly, an RRC reconfiguration complete message serving as a response message thereto is equivalent to an RRC connection reconfiguration complete message. The handover command is equivalent to the RRC message including the handover command, and refers to an RRC message or a configuration in the RRC message triggering the UE to execute a handover. The handover configuration refers to all of or part of configurations in the handover command. "Cancel", "release", "delete", "flush", and "clear" are interchangeable. "Execute", "use", and "apply" are interchangeable. "Configure" and "reconfigure" are interchangeable. "Monitor" and "detect" are interchangeable. An RRC re-establishment message is equivalent to an RRC connection re-establishment message; similarly, an RRC re-establishment complete message serving as a response message thereto is equivalent to an RRC connection re-establishment complete message.

The following describes processes or concepts in the prior art to which the present disclosure relates.

Handover Configuration in NR Systems:

In an NR system, an RRC reconfiguration message for a handover command carries RRC configurations from a target base station, including but not limited to the following RRC configurations (see Section 6.2.2 of 3GPP Technical Standard Protocol 38.331 for details):

A measurement configuration (measconfig information element): used to configure intra-frequency, inter-frequency, and inter-radio access technology measurements performed by UE, for example, a measurement object configuration, a measurement report configuration, a measurement gap configuration, etc.

A cell group configuration (cellGroupConfig information element), used to configure a master cell group or a secondary cell group, including a Radio Link Control (RLC) bearer configuration (an rlc-bearerToAddModList information element and an rlc-bearerToreleaselist information element), a Medium Access Control (MAC) configuration (a MAC-cellgroupconfig information element), a physical layer configuration, a secondary cell addition/modification/release configuration, a special cell (SpCell) configuration, etc. corresponding to a data radio bearer/signaling radio bearer. The sPCell configuration includes a cell index number, handover information (reconfigurationWithSync information element), a radio link failure-related timer and constant configuration, a Radio Link Monitoring (RLM) configuration, a special cell dedicated configuration, etc. The reconfigurationwithsync information element is similar to the mobility control information in the LTE system and includes handover-related information to implement mobility, and the information element includes serving cell configuration common information, a cell radio network temporary identifier (C-RNTI) of the UE in the target cell, a configuration of a handover procedure monitoring timer T304, a random access dedicated configuration for a random access procedure to the target cell, etc.

Non-access stratum dedicated information (dedicatedInfoNASList information element).

A radio bearer configuration (radiobearerConfig information element), used to configure a Service Data Application Protocol layer (SDAP) and a Packet Data Convergence Protocol layer (PDCP) of a Data Radio Bearer (DRB) and/or a Signaling Radio Bearer (SRB).

A master key update configuration (masterKeyupdate information element).

Handover Procedure in NR Systems:

User mobility in a connected state is implemented mainly by means of a handover procedure, and the handover refers to a procedure in which UE in an RRC connected state changes a serving cell (primary cell). FIG. 1 is a schematic diagram showing a general handover procedure. As shown in FIG. 1, a general handover procedure includes the following phases: in phase 1: a measurement phase, UE measures, on the basis of a configured measurement configuration, a radio link corresponding to a serving cell or a neighboring cell. When a configured measurement reporting condition is met, the UE transmits a measurement report to a base station. In phase 2, a handover preparation phase, the base station determines, in view of the received measurement report and other factors such as the load of the base station, to trigger a handover for the UE. A source base station and a target base station acquire, by means of a handover preparation procedure, a handover command configured by the target base station. In phase 3, a handover execution phase, the source base station issues the handover command to the UE. The UE receiving the handover command immediately applies a configuration of the handover command to perform the handover. The UE detects a handover procedure by using a timer T304. When the handover procedure is initiated, the UE starts the timer T304. When the handover procedure is completed, the UE stops the timer T304. When T304 expires, the UE considers that the handover fails.

The NR system also supports a conditional handover (CHO) that is also referred to as a conditional reconfiguration, which is different from the general handover procedure in which the UE immediately performs the handover after receiving the handover command in phase 3. In the conditional handover, a relatively conservative measurement report threshold is set, so that a base station acquires a measurement result in advance, and performs handover preparation with a selected target base station in advance according to the measurement result. In this case, the base station can issue a handover command including a handover candidate cell and a handover execution condition to UE before an actual handover condition (relative to the conservative measurement report threshold) is met, wherein the handover command carries a condition for executing a handover by the UE. After receiving the conditional handover command, the UE will not execute a handover immediately but stores a received handover command configuration, and starts to monitor the link quality of a source cell or the link quality of a target cell according to the handover execution condition carried in the handover command message, so as to evaluate whether the handover execution condition is met. Only when it is determined, by means of monitoring, that the configured handover execution condition is met, does the UE start to execute the stored handover command and access the target cell. The UE may be simultaneously configured with a plurality of conditional handover candidate cells. If the plurality of conditional handover candidate cells all meet the handover execution condition, then the UE selects a candidate cell therefrom as a final conditional handover target cell, and performs the handover to the cell. In summary, the conditional handover refers to a handover procedure that is executed only when (all) one or more configured handover execution conditions are met. Because the handover command is included in the RRC reconfiguration message, the conditional handover is also referred to as a conditional reconfiguration. In the NR system, after the UE receives an RRC reconfiguration message including the conditional handover command (a ConditionalReconfiguration information element), the conditional handover command including a conditional reconfiguration candidate cell list (a condReconfigToAddModList information element), the UE stores configurations corresponding to the conditional reconfiguration candidate cells in a UE variable VarConditionalReconfig, which includes a plurality of items. Each item is identified by a conditional reconfiguration identity (condReconfigId), and includes an execution condition (condExecutionCond) and a target cell handover configuration (condRRCReconfig). A cell identified by a cell identity in a serving cell common configuration (a servingCellConfigCommon information element) in a reconfiguration with sync (a reconfiguration WithSync information element) in the target cell handover configuration corresponds to a conditional reconfiguration candidate cell. The UE performs conditional reconfiguration evaluation on each conditional reconfiguration candidate cell according to the execution condition. The execution condition may include one or two measurement identities (measID). Only when all measurement events (condEventA3 or CondEventA5 included in a CondTriggerConfig information element) corresponding to all measurement identities included in the execution condition are met, the UE considers that the corresponding candidate cell is a triggering cell, and initiates a conditional reconfiguration execution procedure. In the conditional reconfiguration execution procedure, the UE applies, to the selected triggering cell, a stored handover configuration (condRRCReconfig) corresponding to the cell, performs a cell handover operation, such as starting the timer T304, performs downlink synchronization to the target cell, initiates a random access procedure to the target cell to perform uplink synchronization, transmits an RRC reconfiguration complete message to the target cell, and so on (see section 5.3.5.3 of 3GPP protocol specification document TS38.331 for details, which will not be described herein again).

Radio Link Failure (RLF) or Handover Failure (HOF) Recovery:

When an RLF of a master cell group is detected or a handover failure (including a general handover failure and a conditional handover failure) occurs because T304 associated with the master cell group expires, the UE will initiate an RRC connection re-establishment procedure to re-establish/recover a connection to the network side. In the initiated RRC connection re-establishment procedure, the UE first performs a cell selection procedure to select a suitable cell. In the case that a conditional reconfiguration is stored on the UE, if the UE is configured with an enabling indication (an attemptCondReconfig information element) that a CHO can be performed after a link failure, and if the cell selection procedure is due to an MCG RLF or an MCG handover failure (i.e., a reconfiguration with sync failure in the NR system) being detected, and if the selected cell is a conditional handover candidate cell (a reconfiguration with sync information element reconfiguration WithSync corresponding to the cell is included in a MasterCellGroup information element in the stored conditional reconfiguration variable), then the UE applies the configuration in the conditional reconfiguration according to the conditional handover configuration corresponding to the cell, and performs the handover to the cell (see section 5.3.5.3 of 3GPP protocol specification document TS38.331), thereby ending a link recovery procedure. Otherwise, the UE attempts to recover the connection to the network side by transmitting an RRC connection re-establishment request to the selected cell. When the UE receives an RRC connection re-establishment message serving as a response message, the UE re-establishes an RRC connection according to a configuration in the RRC connection re-establishment message, and feeds back an RRC connection re-establishment complete message to a base station to successfully end the RRC connection re-establishment procedure. If the RRC re-establishment procedure fails, then the UE exits the RRC connected state, and enters an RRC idle state.

For ease of description, the above link recovery performed by means of the conditional handover performed by the conditional reconfiguration candidate cell selected in the RRC re-establishment procedure is referred to as conditional handover recovery.

Fast MCG Link Recovery Mechanism:

The dual connectivity and carrier aggregation enhancement project in Release 16 (see document RP-190452) introduces a fast MCG link recovery mechanism. The so-called “fast” is described relative to the existing link recovery mechanism (i.e., recovering a link connection by means of an RRC connection re-establishment procedure). The purpose of the procedure is to inform the network side that the UE has experienced an MCG radio link failure. In the fast MCG link recovery mechanism, when an RLF occurs in an MCG of the UE, if the link quality of a secondary cell group (SCG) of the UE is good (that is, no RLF occurs and a timer T310 is not running, no PSCell change procedure is occurring (that is, T04 corresponding to the SCG is not running), or the SCG is not in a suspended state (not suspended)), at this time neither the MCG nor the SCG is in the suspended (or interrupted) state or the timer T316 is not in a running state, then the UE initiates an MCG failure information procedure, and reports the MCG link failure information to a master base station by means of an SCG link (such as a split signaling radio bearer (SRB) or a third signaling radio bearer SRB3) instead of directly triggering an RRC connection re-establishment procedure. In the MCG failure information procedure, the UE starts the T316 timer, suspends the MCG-side transmission of all SRBs and DRBs except SRB0, and resets a MAC entity corresponding to the MCG. The master base station receiving the MCG link failure information report may transmit to the UE an RRC reconfiguration message including a reconfiguration with sync information element to trigger a handover of the UE to a new cell, or transmit an RRC release message to release an RRC connection of the UE. Upon receiving the RRC reconfiguration message or the RRC release message as a response from the network side, the UE will stop the T316 timer. In the present disclosure, the MCG failure information procedure and the fast MCG (link) recovery procedure are equivalent.

Successful Handover Report:

As previously described, one of the objectives of the new research project of Release 17 is to introduce handover information reporting of a successful handover. The handover information reporting of a successful handover is also referred to as a successful handover report (SHR) for short. This is because, in an NR system, performing network optimization by relying only on a radio link failure (RLF) report in an existing mechanism may cause a data acquisition process to become lengthened, and handover information reporting, when a handover succeeds, enables the network side to acquire a sufficient number of samples in a mobility procedure more quickly. Second, even for a successful handover scenario, a mobility parameter thereof also needs to be further optimized. Content of successful handover information reporting may include one or more of the following: a source cell identity; a target cell identity; measurement results for a source cell or target cell; measurement results for a neighbor cell(s); an RLF monitoring situation when a handover command is received or when a handover is performed indicating, for example, a cause(s) of successful handover information reporting being triggered (that is, which triggering condition is met), a running situation of T310/T312 (indicating whether T310 and/or T312 exceeds a configured threshold), an RLC retransmission status, etc.; a beam failure monitoring situation when a handover command is received; one or more optimal beam identifiers of the downlink when random access to the target base station is performed; a running status/value of the timer T304 when a handover is successfully completed; random access procedure information; CHO candidate cell information (a measurement result or a cell identity); an indication that an RLF occurs in a source cell in a dual active protocol stack (DAPS) handover procedure, and the like. For some successful handover information, the UE may record the information in the SHR only when a recording condition corresponding to the information is met. For example, if T310 is running, only when the value of T310 exceeds a configured threshold, can the UE include T310-related information in the successful handover report. However, some other information, such as a source cell identity, a target cell identity, etc., needs to be recorded in the SHR unconditionally. Success of the handover means that an RRC reconfiguration complete message for responding to a handover command RRC reconfiguration message with respect to the target base station has been successfully transmitted, or that a random access procedure to the target base station has been successfully completed at a MAC layer. In the present conclusion of the 3GPP, the UE may inform, by using an RRC message, the network side that available successful handover information (for example, indicated by a SuccHORep-Available information element) is present thereon. After receiving the indication, the network side may request, by using an RRC message (for example, indicated by SuccessfulHOReportReq in a UEInformationRequest message), the UE to report the successful handover information report stored thereby. The UE will report the stored radio link failure report (SuccessfulHOReport in the UEInformationResponse message) to the network side in a response RRC message.

Different from the radio link failure report RLF-report, the network side needs to configure, to the UE, a triggering condition of the successful handover information reporting. Only when the configured one or more triggering conditions are met, will the UE record handover information of the successful handover. Therefore, the UE needs to receive, from the network side, a successful handover report configuration parameter at least including a triggering condition configuration. How to configure the successful handover report configuration parameter has become a concern of the present disclosure. In addition, the RAN2 working group of 3GPP has reached the conclusion: a situation in which a link is recovered by means of successfully performed conditional handover recovery when the UE encounters a link failure (an RLF or an HOF) is also considered a link failure situation although a conditional handover is successfully completed. Therefore, whether to initiate recording of conditional handover information of the handover success in the foregoing scenario and how to avoid recording the information if the information does not need to be recorded are also a concern of the present disclosure. The following embodiments provide a solution to the above problems. The embodiments are not mutually exclusive, and some embodiments may be combined. If not otherwise specified, some concepts or definitions are commonly applicable among the embodiments. For ease of description, the UE in the following embodiments refers to UE having the function of supporting an SHR.

Example 1

This example provides a successful handover report (SHR) configuration management method performed on UE. In the method described in this example, UE releases an applied SHR configuration when a CHO recovery mechanism is performed, thereby achieving the purpose of skipping recording of a corresponding SHR for the handover in the foregoing scenario and the purpose of reducing signaling overhead and energy consumption of the UE.

FIG. 2 is a flowchart showing an example of a handover information reporting method according to Example 1 of the present disclosure. As shown in FIG. 2, an embodiment of Example 1 includes the following steps:

step 1: selecting, by UE, a suitable cell in a cell selection procedure, determining that a CHO recovery condition is met, initiating, by the UE, a conditional handover to the selected cell, and recovering a link by means of performing the conditional handover to the cell.

The determining, by the UE, that a CHO recovery condition is met means that the UE is configured with an enabling indication (an attemptCondReconfig information element) that a CHO can be performed after a link failure, and the cell selection procedure is due to an MCG RLF or an MCG handover failure (i.e., a reconfiguration with sync failure in an NR system) being detected, and the selected cell is one of conditional handover candidate cells. The candidate cell means that a reconfiguration with sync information element reconfiguration WithSync corresponding to the cell is included in a MasterCellGroup information element in a stored conditional reconfiguration variable VarConditionalReconfig.

The initiating, by the UE, a conditional handover to the selected cell means that the UE applies a conditional reconfiguration (CondRRCReconfig) stored thereon and associated with the selected cell, and performs a handover operation to the cell according to the configuration (the operation is section 5.3.5.3 of protocol specification document TS38.331), for example, triggering a random access procedure to the target cell.

The cell selection procedure refers to a cell selection procedure performed while a timer T311 is running. The UE starts the timer T311 in an initialization phase of initiating an RRC re-establishment procedure, and starts to perform the cell selection procedure. When the UE selects a suitable cell, T311 is stopped.

Step 2: releasing, by the UE, an SHR-related configuration.

Preferably, the SHR-related configuration at least includes a triggering condition for triggering the UE to record an SHR. The UE may be configured with one or more triggering conditions, such as a timer T310 threshold, a timer T312 threshold, a timer T304 threshold, and the like. The triggering conditions mean that the UE performs the operation of recording the SHR only when the UE is configured with the triggering conditions and one or more of the configured triggering conditions are met.

Step 2 may occur at any time in a handover procedure (an RRC reconfiguration procedure of a conditional reconfiguration execution) of the selected cell performed by the UE. For example, when the UE initiates the handover procedure, the operation of releasing the SHR-related configuration is performed immediately. Alternatively, the operation of releasing the SHR-related configuration is performed when the UE successfully completes the handover. Preferably, the handover being successfully completed means that the random access procedure triggered by the handover procedure has been successfully completed in the MAC layer.

That is, in this example, when the UE performs a reconfiguration operation according to a received RRC reconfiguration (corresponding conditional reconfiguration) message, if an RRC reconfiguration is applied due to a conditional reconfiguration execution upon cell selection while the timer T311 is running, the UE releases the SHR configuration thereof.

In the above method, the condition of the UE releasing the SHR-related configuration thereof further includes the UE determining that the UE is configured with the SHR-related configuration. Optionally, the UE determines that the UE is configured with the PCell specific SHR-related configuration or the SHR-related configuration corresponding to the PCell.

Variant embodiment 1 of this example may be described as that, in step 1, the UE determines that the CHO recovery condition is met, and the UE applies other configurations, besides the SHR-related configuration, in the conditional reconfiguration (CondRRCReconfig) stored thereon and associated with the selected cell, and performs the handover operation to the cell according to the configuration.

Variant embodiment 2 of this example may be described as that, in step 1, when the UE determines that the CHO recovery condition is met, the UE releases the SHR-related configuration thereon.

Variant embodiment 3 of this example may be described as that, before CHO recovery is performed, the UE performs the operation of releasing the SHR-related configuration thereon. The described before CHO recovery is performed may be when an RLF is detected, or when T304 expires (a reconfiguration with sync failure), or in an initialization phase of an RRC re-establishment procedure initiated by the UE.

Variant embodiment 4 of this example may be described as that, when the UE determines that a CHO recovery procedure is successfully completed or the UE determines that the handover procedure is successfully completed, the UE performs the operation of releasing the SHR-related configuration thereon.

It is worth noting that the above variant embodiments cause both foregoing step 1 and step 2 to be optional.

Example 2

This example provides a successful handover report (SHR) recording method performed on UE. In the method described in this example, when UE performs a handover in a CHO recovery scenario, no handover information SHR of the handover is recorded in a UE variable VarSuccHOReport, thereby achieving the purpose of reducing signaling overhead and energy consumption of the UE. Different from Example 1, Example 2 does not require any operation to be performed on an SHR-related configuration. That is, the SHR-related configuration can still be maintained on the UE, or the SHR-related configuration may be released at a certain moment.

Figure 3:
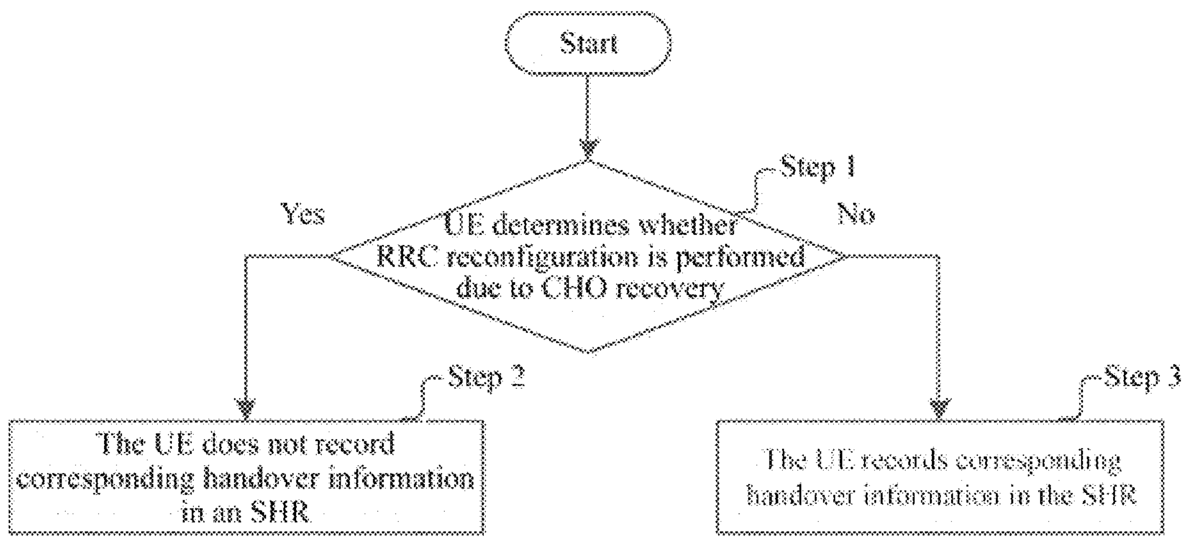
FIG. 3 is a flowchart showing an example of a handover information reporting method according to Example 2 of the present disclosure.

FIG. 3 is a flowchart showing an example of a handover information reporting method according to Example 2 of the present disclosure.

As shown in FIG. 3, in this example, in step 1, in an RRC reconfiguration procedure, UE determines whether the RRC reconfiguration is performed due to a CHO recovery. If it is determined in step 1 that the RRC reconfiguration is performed due to a CHO recovery, step 2 is performed, and the UE does not record corresponding handover information in an SHR for this handover. Optionally, the method further includes: discarding, by the UE, handover information stored thereon and recorded for the handover procedure. The UE discards the handover information stored thereon and recorded for the handover procedure because in some embodiments, the UE, upon initiation of the handover procedure, may have created and stored some acquired handover information related to the handover, such as timer information (an indication that T310 or T312 exceeds a threshold/T310 or T312 has triggered SHR recording) of a source cell when the RRC reconfiguration is received or performed.

If it is determined in step 1 that the RRC reconfiguration is not performed due to a CHO recovery, that is, the UE determines that the RRC reconfiguration is not performed due to a CHO recovery, and one or more of SHR triggering conditions in an SHR-related configuration are met, step 3 is performed, and the UE records the corresponding handover information in the SHR for this handover. In addition, the determination operation of the UE further includes the UE determining that the UE is configured with the SHR-related configuration, such as the SHR triggering condition(s).

Preferably, the operation of the UE determining whether to record the SHR is performed when the UE successfully completes the RRC reconfiguration (the handover procedure). Preferably, the successfully completing the RRC reconfiguration means that the random access procedure triggered by the RRC reconfiguration has been successfully completed in the MAC layer. Optionally, the operation of the UE determining whether to record the SHR is performed by the UE at the start of the RRC reconfiguration (the handover procedure).

The above RRC reconfiguration being performed due to the CHO recovery is further described as being applied if the RRC reconfiguration due to a conditional reconfiguration execution upon cell selection while the timer T311 is running.

The one or more of the above SHR triggering conditions being met depends on what the configured SHR triggering conditions are. For example, the configured SHR triggering condition may be that the value of T310 is greater than or equal to a configured threshold, or that the value of T312 is greater than or equal to a configured threshold, or that the value of T304 is greater than or equal to a configured threshold. Preferably, the value of T310 or T312 refers to a state value of T310 or T312 associated with the source cell when a handover command is received or when the handover is performed. The value of T304 refers to a state value of T304 when the handover is successfully completed, that is, a state value before T304 is stopped. As long as one of the SHR triggering conditions configured for the UE is met, it can be considered that the UE meets the triggering condition of recording the SHR, and can be triggered to record the SHR of this handover.

The UE recording corresponding handover information in the SHR for this handover may be first clearing a UE variable (e.g., VarSuccHOReport) for storing the SHR, and then recording the handover information related to this handover, or may be the UE first adding a new entry to the UE variable for storing the SHR, and then recording the handover information related to this handover in the new entry.

Example 3

This example provides an SHR-related configuration method implemented on a source cell and a target cell of a handover. In the method described in this example, the network side may complete an SHR configuration for one handover procedure, thereby achieving the purpose of configuring a different SHR-related configuration by being able to more finely distinguish each handover.

Specifically, a communication system of this example includes: a source cell communicating with UE, and a target cell serving as an object to which the UE is handed over. An SHR configuration method in the communication system of this example may include the following steps.

Step 1: initiating, by the source cell, a handover preparation operation for UE to the target cell, and transmitting a handover request message to the target cell by means of an Xn or X2 interface, the handover request message including an SHR-related configuration. The SHR-related configuration at least includes an SHR triggering condition for triggering the UE to record a handover information SHR of the present handover. Preferably, the SHR-related configuration is included in an inter-node RRC message. The inter-node RRC message is an RRC container included in the handover request message. In this example, the inter-node RRC message is a HandoverPreparationInformation message. Alternatively, the SHR-related configuration acts as an information element of an XnAP or X2 interface, and is included in the handover request message.

Step 2: including, by the target cell, the received SHR-related configuration in a handover command (an RRC reconfiguration message generated by a target base station), and including the handover command in a handover request response message and transmitting same to the source cell.

Optionally, in this step, if the target cell determines that another SHR-related configuration needs to be configured, then the target cell configures the SHR-related configuration received from the source cell and the SHR-related configuration determined by the target cell in the handover command together. That is, the SHR-related configuration in the handover command may include both the SHR-related configuration determined by the source cell and the SHR-related configuration determined by the target cell.

Step 3: transparently delivering, by the source cell, the handover command in the handover request message to the UE.

Example 4

This example provides another SHR configuration method. Different from Example 3, in this example, the SHR configuration is completely determined or configured by a source cell. In the method described in this example, the network side may more flexibly implement cell-level SHR configuration for UE.

Step 1: receiving, by the UE from the network side, an RRC reconfiguration message including an SHR-related configuration, and storing or applying the SHR-related configuration.

The SHR-related configuration at least includes one or more SHR triggering conditions for triggering the UE to record an SHR.

In an embodiment, the SHR-related configuration is target cell-specific. That is, the SHR-related configuration may include a plurality of entries, and each entry includes or corresponds to one (target) cell identity and a corresponding SHR configuration.

Step 2: initiating, by the UE, a reconfiguration with sync procedure (a handover procedure), and if a target cell of the reconfiguration with sync procedure is identical to a cell identity in an entry in the SHR-related configuration in step 1, then applying, by the UE, an SHR configuration corresponding to the cell identity to perform SHR recording. That is, if the target cell of the reconfiguration with sync procedure is a cell identity included in the SHR-related configuration in step 1, then the UE applies an SHR configuration corresponding to the cell identity to perform SHR recording.

Optionally, if the target cell of the reconfiguration with sync procedure is not a cell identity included in the SHR-related configuration in step 1, then the UE does not record an SHR related to the reconfiguration with sync procedure.

The reconfiguration with sync procedure is triggered by reception of an RRC reconfiguration message including a reconfiguration with sync information element, or is triggered by a CHO execution. The cell identity may be a cell global identity, or a physical cell identity, and/or a cell carrier frequency.

For example, in step 1, in the RRC reconfiguration message received by the UE, the SHR-related configuration includes three items, which are respectively: a cell identity of a cell A and an SHR configuration corresponding thereto, a cell identity of a cell B and an SHR configuration corresponding thereto, and a cell identity of a cell C and an SHR configuration corresponding thereto. In this case, the UE stores the three SHR configurations. In step 2, the UE receives a handover command including the cell identity of the target cell B, then the UE applies the SHR configuration corresponding to the cell B in step 1, and determines, on the basis of the foregoing configuration, whether an SHR triggering condition is met to record an SHR of this handover procedure and other SHR content.

Example 5

This example provides a successful handover report (SHR) configuration management method performed on UE. In the method described in this example, UE releases an applied SHR configuration when a fast MCG recovery mechanism is performed, thereby achieving the purpose of skipping recording of a corresponding SHR for the handover in this scenario.

In an embodiment, the following steps are included:

step 1: initiating, by the UE, an MCG failure information procedure, and transmitting an MCG failure information message to a network side.

Step 2: receiving, by the UE, an RRC reconfiguration message transmitted from the network side, and performing a reconfiguration with sync procedure (a handover procedure) on the basis of the foregoing.

Step 3: releasing, by the UE, an SHR-related configuration.

Preferably, the SHR-related configuration at least includes a triggering condition for triggering the UE to record an SHR. The UE may be configured with one or more triggering conditions, such as a timer T310 threshold, a timer T312 threshold, a timer T304 threshold, and the like.

In this example, the chronological order of implementation of the UE operation in step 3 is not limited.

Optionally, step 3 may occur at any time in a handover procedure performed by the UE in step 2. For example, when the UE initiates the handover procedure, the operation of releasing the SHR-related configuration is performed immediately. Alternatively, the operation of releasing the SHR-related configuration is performed when the UE successfully completes the handover. The handover being successfully completed means that a random access procedure triggered by the handover has been successfully completed in the MAC layer. Optionally, when RRC reconfiguration (reconfiguration with sync) is performed, the UE performs step 3 if a timer T316 is running.

Optionally, step 3 may occur at any time of the MCG failure information procedure in step 1, for example, in an initialization phase of the MCG failure information procedure initiated by the UE, or before or after the UE transmits the MCG failure information message. Optionally, when the MCG failure information procedure is performed, the UE performs step 3 if the timer T316 is running.

In the above method, the condition of the UE releasing the SHR-related configuration thereof further includes the UE determining that the UE is configured with the SHR-related configuration. Optionally, the UE determines that the UE is configured with the PCell specific SHR-related configuration. Here, the PCell refers to a target cell in the reconfiguration with sync in step 2.

A variant embodiment of this example may be described as that, before step 1, the UE performs the operation of releasing the SHR-related configuration thereon. The before step 1 may be when an RLF is detected. The foregoing causes both foregoing step 1 and step 2 to be optional.

Example 6

This example provides a successful handover report (SHR) recording method performed on UE. In the method described in this example, when UE performs a handover in a fast MCG recovery mechanism, no handover information SHR of the handover is recorded in a UE variable VarSuccHOReport. Different from Example 5, Example 6 does not release a SHR configuration. That is, the SHR configuration is still maintained on the UE.

In this example, in an RRC reconfiguration procedure, the UE determines whether the RRC reconfiguration is performed due to fast MCG recovery, and if the RRC reconfiguration is performed due to fast MCG recovery, the UE does not record corresponding handover information in an SHR for this handover. Optionally, the method further includes: discarding, by the UE, handover information stored thereon and recorded for the handover procedure. The UE discards the handover information stored thereon and recorded for the handover procedure because in some embodiments, the UE, upon initiation of the handover procedure, may have created and stored some acquired handover information related to the handover, such as timer information (an indication that T310 or T312 exceeds a threshold/T310 or T312 has triggered SHR recording) of a source cell when the RRC reconfiguration is received or performed.

In other words, when the UE determines that the RRC reconfiguration is not performed due to fast MCG recovery, and one or more of SHR triggering conditions in an SHR-related configuration are met, the UE records the corresponding handover information in the SHR for this handover. In addition, the determination operation of the UE further includes the UE determining that the UE is configured with the SHR-related configuration, such as the SHR triggering condition(s).

Preferably, the operation of the UE determining whether to record the SHR is performed when the UE successfully completes the RRC reconfiguration (the handover procedure). Preferably, the successfully completing the RRC reconfiguration means that the random access procedure triggered by the RRC reconfiguration has been successfully completed in the MAC layer. Optionally, the operation of the UE determining whether to record the SHR is performed by the UE at the start of the RRC reconfiguration (the handover procedure).

The above RRC reconfiguration being performed due to the fast MCG recovery is further described as if T316 is running when an RRC reconfiguration message is received (or, when reconfiguration with sync is performed). Alternatively, the above RRC reconfiguration being performed due to the fast MCG recovery is described as if the UE transmits an MCG failure information message or initiates an MCG failure information procedure before reception of the RRC reconfiguration message. Alternatively, the above RRC reconfiguration being performed due to the fast MCG recovery is described as reception of the RRC reconfiguration message being a response to the MCG failure information message.

The one or more of the above SHR triggering conditions being met depends on what the configured SHR triggering conditions are. For example, the configured SHR triggering condition may be that the value of T310 is greater than or equal to a configured threshold, or that the value of T312 is greater than or equal to a configured threshold, or that the value of T304 is greater than or equal to a configured threshold. Preferably, the value of T310 or T312 refers to a state value of T310 or T312 associated with the source cell when a handover command is received or when the handover is performed. The value of T304 refers to a state value of T304 when the handover is successfully completed, that is, a state value before T304 is stopped.

Example 7

Figure 4:
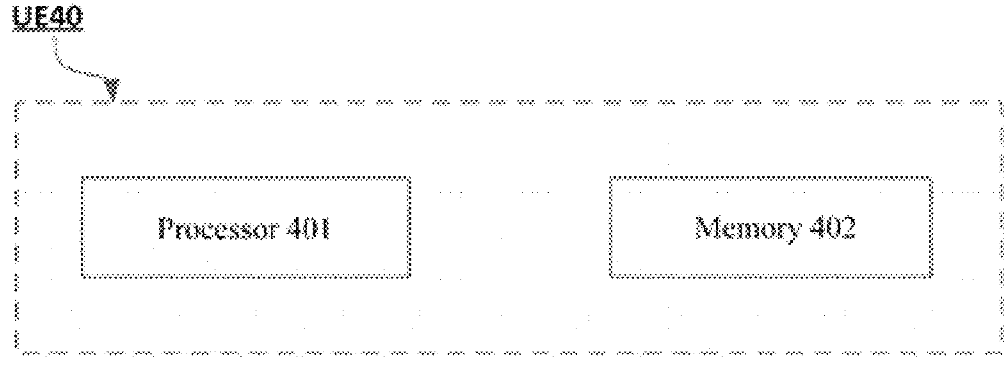
FIG. 4 shows a block diagram of user equipment (UE) according to the present disclosure.

In this example, user equipment according to the present disclosure is described. FIG. 4 shows a block diagram of user equipment (UE) according to the present invention. As shown in FIG. 4, the user equipment (UE) 40 includes a processor 401 and a memory 402. The processor 401 may include, for example, a microprocessor, a microcontroller, an embedded processor, and the like. The memory 402 may include, for example, a volatile memory (such as a random access memory (RAM)), a hard disk drive (HDD), a non-volatile memory (such as a flash memory), or other memories. The memory 402 stores program instructions. When run by the processor 401, the instructions can perform the above handover information reporting method described in detail in the present invention.

The methods and related devices according to the present disclosure have been described above in conjunction with preferred embodiments. It should be understood by those skilled in the art that the methods shown above are only exemplary. The method according to the present disclosure is not limited to steps or sequences shown above. The base station and user equipment shown above may include more modules. For example, the base station and user equipment may further include modules that may be developed or will be developed in the future to be applied to a base station, an MME, or UE. Various identifiers shown above are only exemplary, not for limitation, and the present disclosure is not limited to specific information elements serving as examples of these identifiers. A person skilled in the art could make various alterations and modifications according to the teachings of the illustrated embodiments.

The program running on the device according to the present disclosure may be a program that enables a computer to implement the functions of the embodiments of the present disclosure by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present disclosure may be recorded on a computer-readable recording medium. The corresponding functions may be achieved by reading programs recorded on the recording medium and executing the programs by the computer system. The phrase "computer system" herein may be a computer system embedded in the device, which may include operating systems or hardware (e.g., peripherals). The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application-specific integrated circuits (ASICs), field-programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications may be made to the present disclosure within the scope of the claims. Embodiments resulted from the appropriate combinations of the technical means disclosed in different embodiments are also included within the technical scope of the present disclosure. In addition, components with the same effect described in the above embodiments may be replaced with one another.

The invention claimed is:

1. A User Equipment (UE), comprising:

a processor configured to:

perform a Radio Resource Control (RRC) reconfiguration procedure;

determine, during the RRC reconfiguration procedure, whether an applied RRC reconfiguration is due to a conditional reconfiguration execution upon a cell selection performed while a timer used for an RRC reestablishment procedure was running; and in a case that (i) the UE is configured with a Successful Handover Report (SHR) configuration, (ii) the UE determines that the applied RRC reconfiguration is not due to the conditional reconfiguration execution, and (iii) one or more SHR triggering conditions in the SHR configuration are fulfilled, record handover information in a UE variable for an SHR.

2. The UE according to claim 1, wherein the processor is further configured to:

record the handover information in the UE variable for the SHR upon successfully completing a Random Access (RA) procedure triggered for the applied RRC reconfiguration.

3. The UE according to claim 1, wherein the SHR configuration includes one or more of a T310 threshold, a T312 threshold, and a T304 threshold.

4. A method performed by a User Equipment (UE), the method comprising:

performing a Radio Resource Control (RRC) reconfiguration procedure;

determining, during the RRC reconfiguration procedure, whether an applied RRC reconfiguration is due to a conditional reconfiguration execution upon a cell selection performed while a timer used for an RRC reestablishment procedure was running; and in a case that (i) the UE is configured with a Successful Handover Report (SHR) configuration, (ii) the UE determines that the applied RRC reconfiguration is not due to the conditional reconfiguration execution, and (iii) one or more SHR triggering conditions in the SHR configuration are fulfilled, recording handover information in a UE variable for an SHR.

5. A base station apparatus that communicates with a User Equipment (UE), the base station apparatus comprising:

a processor configured to perform a Radio Resource Control (RRC) reconfiguration procedure, thereby causing the UE to:

determine, during the RRC reconfiguration procedure, whether an applied RRC reconfiguration is due to a conditional reconfiguration execution upon a cell selection performed while a timer used for an RRC reestablishment procedure was running; and in a case that (i) the UE is configured with a Successful Handover Report (SHR) configuration, (ii) the UE determines that the applied RRC reconfiguration is not due to the conditional reconfiguration execution, and (iii) one or more SHR triggering conditions in the SHR configuration are fulfilled, record handover information in a UE variable for an SHR.

6. The base station apparatus according to claim 5, wherein the handover information is recorded in the UE variable for the SHR upon successful completion of a Random Access (RA) procedure triggered for the applied RRC reconfiguration.

7. The base station apparatus according to claim 5, wherein the SHR configuration includes one or more of a T310 threshold, a T312 threshold, and a T304 threshold.

* * * * *